US012654156B2

(12) United States Patent
Kirilin et al.

(10) Patent No.: US 12,654,156 B2
(45) Date of Patent: Jun. 16, 2026

(54) PROCESS AND CATALYST FOR OXIDATIVE ESTERIFICATION WITH MECHANICALLY STRONG AND CHEMICALLY RESISTANT CATALYST

(71) Applicants: Dow Global Technologies LLC, Midland, MI (US); Rohm and Haas Company, Collegeville, PA (US)

(72) Inventors: Alexey Kirilin, Terneuzen (NL); Kirk W. Limbach, Dresher, PA (US); Wen Sheng Lee, Midland, MI (US); Jeffrey A. Herron, Midland, MI (US); Victor J. Sussman, Midland, MI (US)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 601 days.

(21) Appl. No.: 18/011,208

(22) PCT Filed: Jul. 13, 2021

(86) PCT No.: PCT/US2021/041357
§ 371 (c)(1),
(2) Date: Dec. 19, 2022

(87) PCT Pub. No.: WO2022/015680
PCT Pub. Date: Jan. 20, 2022

(65) Prior Publication Data
US 2023/0321637 A1 Oct. 12, 2023

Related U.S. Application Data

(60) Provisional application No. 63/051,583, filed on Jul. 14, 2020.

(51) Int. Cl.
| | |
|---|---|
| *B01J 23/52* | (2006.01) |
| *B01J 27/224* | (2006.01) |
| *B01J 35/00* | (2024.01) |
| *B01J 35/10* | (2006.01) |
| *B01J 35/30* | (2024.01) |
| *B01J 35/61* | (2024.01) |
| *B01J 35/63* | (2024.01) |
| *B01J 35/64* | (2024.01) |
| *B01J 37/02* | (2006.01) |
| *B01J 37/08* | (2006.01) |
| *B01J 37/12* | (2006.01) |

(52) U.S. Cl.
CPC ............. *B01J 23/52* (2013.01); *B01J 27/224* (2013.01); *B01J 35/397* (2024.01); *B01J 35/613* (2024.01); *B01J 35/633* (2024.01);

*B01J 35/635* (2024.01); *B01J 35/647* (2024.01); *B01J 37/0203* (2013.01); *B01J 37/12* (2013.01)

(58) Field of Classification Search
CPC . B01J 23/52; B01J 23/66; B01J 23/681; B01J 23/682; B01J 23/685; B01J 23/688; B01J 23/8906; B01J 23/8913; B01J 23/892; B01J 27/224; C07C 67/39; C07C 69/54
See application file for complete search history.

(56) References Cited

U.S. PATENT DOCUMENTS

| | | | |
|---|---|---|---|
| 7,326,806 B2 | 2/2008 | Hayashi et al. | |
| 10,232,353 B2 | 3/2019 | Lygin et al. | |
| 11,279,667 B2 | 3/2022 | Krill et al. | |
| 2006/0153765 A1 | 7/2006 | Pham-Huu et al. | |
| 2008/0103333 A1 | 5/2008 | Nubel et al. | |
| 2011/0184206 A1 | 7/2011 | Suzuki et al. | |
| 2014/0350317 A1* | 11/2014 | Blommel | C07C 1/2072 585/322 |
| 2015/0183705 A1* | 7/2015 | Metelski | C07C 51/43 562/413 |
| 2018/0273463 A1* | 9/2018 | Miller | B01J 35/393 |

FOREIGN PATENT DOCUMENTS

| | | | | | |
|---|---|---|---|---|---|
| CN | 105435809 A | * | 3/2016 | | |
| CN | 105233822 | | 12/2017 | | |
| CN | 105013481 | | 2/2018 | | |
| CN | 111333493 A | * | 6/2020 | .......... | B01J 27/1856 |
| JP | 2002210369 A | | 7/2002 | | |
| JP | 6750942 | | 7/2015 | | |
| WO | 2014061087 | | 4/2014 | | |
| WO | 2019022882 | | 1/2019 | | |
| WO | 2019139720 A1 | | 7/2019 | | |

OTHER PUBLICATIONS

Machine translation of Kawamura et al.(WO2014/061087), publication date Apr. 24, 2014.*
Guo, "Visible-Light-Driven Selective Photocatalytic Hydrogenation of Cinnamaldehyde over Au/SiC Catalysts" 2016, vol. 138, p. 9361-9364.
Office Action for the corresponding Japanese Application No. 2023-500431, Dated: Jul. 28, 2025; 5 pages, English translation.

* cited by examiner

*Primary Examiner* — Jun Li
(74) *Attorney, Agent, or Firm* — CANTOR COLBURN LLP

(57) ABSTRACT

A catalyst comprising a noble metal disposed on a support. The noble metal is present in an amount ranging from 0.1 wt % to 10 wt % relative to the total weight of the catalyst. The support comprises at least 50 wt % silicon carbide relative to the total weight of the support. The silicon carbide has a surface area of at least 5 m²/g. A method for preparing methyl methacrylate from methacrolein and methanol using the catalyst is also disclosed.

12 Claims, No Drawings

PROCESS AND CATALYST FOR OXIDATIVE ESTERIFICATION WITH MECHANICALLY STRONG AND CHEMICALLY RESISTANT CATALYST

BACKGROUND OF THE INVENTION

The invention relates to a catalyst and method for preparing methyl methacrylate from methacrolein and methanol.

WO 2019/057458 discloses a process for preparing a carboxylic ester from an aldehyde via heterogeneous catalysis in a liquid phase in the presence of a catalyst particle. The catalyst particle consists of 0.1% to 3% by weight of gold, 25% to 99.8% by weight of $TiO_2$, 0% to 50% by weight of silicon oxide, 0% to 25% by weight of $Al_2O_3$, 0% to 25% by weight of at least one oxide of an alkali metal, an alkaline earther metal, a rare earth metal, and/or zirconium, 0% to 20% by weight of at least one oxide selected from the group consisting of an iron oxide, a zinc oxide, and a cobalt oxide, and 0% to 5% by weight of at least one other component. The catalyst is preferably composed predominantly or exclusively of gold and $TiO_2$.

WO 2016/113106 discloses catalysts for oxidative esterification reactions for the production of methyl (meth)acrylate from (meth)acrolein. The catalysts are hydrolysis-resistant catalyst in the form of particles comprising 0.01 to 10 mol % gold, 40 to 94 mol % silicon, 3 to 40 mol % aluminum, and 2 to 40 mol % of at least one further element selected from alkali metals, alkaline earth metals, lanthanides having atomic numbers 57 to 71, Y, Sc, Ti, Zr, Cu, Mn, Pb, and/or Bi.

Oxidative esterification reactions to form methyl methacrylate from methacrolein and methanol often neutralize the acidic environment with a base because conventional catalysts often have low acid resistance.

There is a need for an improved catalyst and process for production of methyl methacrylate where the catalyst is mechanically tough, chemically resistant in acidic or basic environments, offers high selectivity, and/or reduces formation of byproducts.

SUMMARY OF THE INVENTION

One aspect of the present invention relates to a catalyst comprising a noble metal disposed on a support, wherein the noble metal is present in an amount ranging from 0.1 wt % to 10 wt % relative to the total weight of the catalyst, wherein the support comprises at least 50 wt % silicon carbide relative to the total weight of the support, and wherein the silicon carbide has a surface are of at least 5 $m^2/g$.

Another aspect of the present invention relates to a method for preparing methyl methacrylate from methacrolein and methanol; said method comprising contacting in a reactor a mixture comprising methacrolein, methanol and oxygen in the presence of a catalyst comprising a noble metal disposed on a support, wherein the noble metal is present in an amount ranging from 0.1 wt % to 10 wt % relative to the total weight of the catalyst, wherein the support comprises at least 50 wt % silicon carbide relative to the total weight of the support, wherein the silicon carbide has a surface area of at least 5 $m^2/g$.

DETAILED DESCRIPTION OF THE INVENTION

All percentage compositions are weight percentages (wt %), and all temperatures are in ° C., unless otherwise indicated. Averages are arithmetic averages unless otherwise indicated. As defined herein, the term "noble metal" is any of gold, platinum, iridium, osmium, silver, palladium, rhodium and ruthenium. More than one noble metal may be present in the catalyst, in which case the limits apply to the total of all noble metals. The "catalyst center" is the centroid of the catalyst particle, i.e., the mean position of all points in all coordinate directions. A diameter is any linear dimension passing through the catalyst center and the average diameter is the arithmetic mean of all possible diameters. The aspect ratio is the ratio of the longest to the shortest diameters. Unless otherwise stated, the average diameter of a particle refers to the average diameter of the particle after the catalyst has been prepared and before the catalyst has been used. An aged catalyst is a catalyst that has been used.

The catalyst of the present invention comprises a noble metal disposed on a support to form a catalyst particle.

Preferably, the noble metal is selected from gold and palladium. More preferably, the noble metal comprises, consists essentially of, or consists of gold. As used herein, the phrase "consists essentially of gold" means that the noble metal comprises at least 95 wt % gold with respect to the total weight of noble metal in the catalyst. Preferably, the noble metal comprises at least 75 wt % gold relative to the total amount of the noble metal. More preferably, the noble metal comprises at least 85 wt % gold relative to the total amount of the noble metal.

The support comprises at least 50 wt % silicon carbide (SiC) relative to the total weight of the support. Preferably, the support comprises at least 60 wt % SiC relative to the total weight of the support. More preferably, the support comprises at least 70 wt. % SiC relative to the total weight of the support.

The silicon carbide of the support has a surface area greater than 5 $m^2/g$, preferably greater than 10 $m^2/g$, preferably greater than 30 $m^2/g$, preferably greater than 50 $m^2/g$, preferably greater than 100 $m^2/g$, preferably greater than 120 $m^2/g$.

The support of the catalyst may further comprise a promoter. When present, the catalyst may comprise up to 50 wt % of the promoter relative to the total weight of the support. The promoter may comprise, for example, titanium, zirconium, scandium, yttrium, lanthanum, vanadium, niobium, chromium, manganese, iron, cobalt, nickel, aluminum, gallium, indium, cerium, tin, lead, bismuth, sulfur (e.g., sulfide, sulfate, or thiosulfate), alkali metals, or alkaline earth metals. Preferably, the promoter comprises titanium, zirconium, alkali metals, or alkaline earth metals in their oxide form. Preferably, the catalyst comprises a promoter selected from titanium and zirconium. More preferably, the catalyst comprises a promoter selected from titanium. The promoter exists in the most thermodynamically stable form when the catalyst is produced. For example, after calcination at 600° C., a promoter comprising zirconium will exist as zirconium oxide, $ZrO_2$. Therefore, the promoter may be present as an oxide of titanium, zirconium, scandium, yttrium, lanthanum, vanadium, niobium, chromium, manganese, iron, cobalt, nickel, aluminum, gallium, indium, cerium, tin, lead, bismuth, sulfur, alkali metals, or alkaline earth metals rather than exist in the elemental form. Alternatively, the promoter may be reduced following calcination so that it exists in its elemental form. For example, iron oxide can be reduced to its elemental form. Preferably, the promoter exists in its most thermodynamically stable form, e.g., an oxide.

The SiC of the support may form a solid particle center. Alternatively, the SiC may be a coating on another solid or the catalyst particle may comprise SiC coated with another material. When the SiC is a coating on another solid core particle, the SiC is preferably formed on a core particle of γ-, δ-, or θ-alumina, silica, magnesia, zirconia, hafnia, vanadia, niobium oxide, tantalum oxide, ceria, yttria, lanthanum oxide or a combination thereof. More preferably, the core particle comprises, consists of, or consists essentially of γ-, δ-, or θ-alumina, silica, and magnesia. Even more preferably, the core particle comprises, consists of, or consists essentially of silica. As used herein with respect to the core particle, the phrase "consists essentially of" means that the core particle comprises at least 95 wt % of the stated material with respect to the total weight of the core particle.

When the catalyst particle comprises SiC coated with another material, the SiC may be coated with a material such as, for example, alumina, silica, magnesia, zirconia, hafnia, vanadia, niobium oxide, tantalum oxide, ceria, yttria, lanthanum oxide, or a combination thereof. Alternatively, the coating may comprise any material that acts as a promoter, including titanium, zirconium, scandium, yttrium, lanthanum, vanadium, niobium, chromium, manganese, iron, cobalt, nickel, aluminum, gallium, indium, cerium, tin, lead, bismuth, sulfur, alkali metals, or alkaline earth metals.

Noble metal particles may be disposed on the outer surface of the support and may form, for example, an "eggshell" layer on the support. Without wishing to be bound by theory, it is believed that an eggshell layer may be more active for oxidative esterification than the remainder of the catalyst. As used herein, the phrase "eggshell layer" comprises at least 80 wt % of the noble metal in the outer 70% of catalyst volume (i.e., the volume of an average catalyst particle), preferably the outer 60% of catalyst volume, more preferably the outer 50%, and even more preferably the outer 40%. The outer volume of any particle shape is calculated for a volume having a constant distance from its inner surface to its outer surface (the surface of the catalyst particle), measured along a line perpendicular to the outer surface. For example, for a spherical particle the outer x % of volume is a spherical shell whose outer surface is the surface of the particle and whose volume is x % of the volume of the entire sphere. The eggshell layer may have a thickness of 500 microns or less, preferably 250 microns or less, and more preferably 100 microns or less.

Preferably, the noble metal particle have an average diameter of less than 15 nm, preferably less than 12 nm, more preferably less than 10 nm, and even more preferably less than 8 nm.

Preferably, the aspect ratio of the catalyst particle is no more than 10:1, preferably no more than 5:1, and preferably no more than 3:1. Although the shape is not limited, preferred shapes for the catalyst particle include spheres, cylinders, rectangular solids, rings, multi-lobed shapes (e.g., cloverleaf cross section), shapes having multiple holes and "wagon wheels;" preferably spheres. Irregular shapes may also be used.

The average diameter of the catalyst particle preferably ranges from 1 micron to 30 mm. When used in a slurry reactor or fluidized bed reactor, the average diameter of the catalyst particle preferably ranges from 1 micron to 200 microns. When used in a catalyst bed or fixed bed reactor, the average diameter of the catalyst particle preferable ranges is greater than 200 microns, such as, for example, from greater than 200 microns to 30 mm Preferably, the average diameter of the catalyst particle for a fixed bed reactor is greater than 300 microns, more preferably greater than 400 microns, even more preferably greater than 500 microns, yet more preferably greater than 600 microns, still more preferably greater than 700 microns, and even still more preferably at least 800 microns; preferably no more than 30 mm, more preferably no more than 20 mm, even more preferably no more than 10 mm, still more preferably no more than 5 mm, and yet more preferably no more than 4 mm.

Preferably, the amount of noble metal ranges from 0.1 wt % to 10 wt % relative to the total weight of the catalyst. More preferably, the amount of noble metal ranges from 0.2 to 5 wt % relative to the total weight of the catalyst. The amount of noble metal is preferably at least 0.5 wt %, preferably at least 0.8 wt %, preferably at least 1 wt %, preferably at least 1.2 wt %; preferably no more than 4 wt %, preferably no more than 3 wt %, preferably no more than 2.5 wt % relative to the total weight of the catalyst.

According to at least one embodiment, the noble metal comprises gold, and the support comprises SiC with a titanium oxide promoter.

Preferably, the catalyst is produced by precipitating the noble metal and, optionally, a promoter from an aqueous solution of metal salts in the presence of the SiC-containing support. In one preferred embodiment, the catalyst is produced by an incipient wetness technique in which an aqueous solution of a suitable noble metal precursor salt and, optionally, the salt of a precursor metal is added to a SiC-containing support such that the pores are filled with the solution and the water is then removed by drying. The resulting material is then converted into a finished catalyst by calcination, reduction, or other pre-treatments known to those skilled in the art to decompose the noble metal salts and, optionally, the promoter salts into metals or metal oxides. Preferably, a $C_2$-$C_{18}$ thiol comprising at least one hydroxyl or carboxylic acid substituent is present in the solution. Preferably, the $C_2$-Cis thiol comprising at least one hydroxyl or carboxylic acid substituent has from 2 to 12 carbon atoms, preferably 2 to 8, preferably 3 to 6. Preferably, the thiol compound comprises no more than 4 total hydroxyl and carboxylic acid groups, preferably no more than 3, preferably no more than 2. Preferably, the thiol compound has no more than 2 thiol groups, preferably no more than one. If the thiol compound comprises carboxylic acid substituents, they may be present in the acid form, conjugate base form or a mixture thereof. Especially preferred thiol compounds include thiomalic acid, 3-mercaptopropionic acid, thioglycolic acid, 2-mercaptoethanol and 1-thioglycerol, including their conjugate bases.

In one embodiment of the invention, the catalyst is produced by deposition precipitation in which SiC-containing support is immersed in an aqueous solution containing a suitable noble metal precursor salt and, optionally, a salt of a promoter and the salts are then made to interact with the surface of the SiC-containing support by adjusting the pH of the solution. The resulting treated solid is then recovered (e.g. by filtration) and then converted into a finished catalyst by calcination, reduction, or other pre-treatments known to those skilled in the art to decompose the noble metal salts and, optionally, promoter salts into metals or metal oxides.

Preferably, the process for producing methyl methacrylate (MMA) is performed in an oxidative esterification reactor (OER). The catalyst particles may be present in a slurry or in a catalyst bed. The catalyst particles in the catalyst bed typically are held in place by solid walls and by screens or catalyst support grids. In some configurations, the screens or grids are on opposite ends of the catalyst bed and the solid walls are on the side(s), although in some configurations the catalyst bed may be enclosed entirely by screens. Preferred shapes for the catalyst bed include a cylinder, a rectangular solid and a cylindrical shell; preferably a cylinder. The OER further comprises a liquid phase comprising methacrolein, methanol and MMA and a gaseous phase comprising oxygen. The liquid phase may further comprise byproducts, e.g., methacrolein dimethyl acetal (MDA) and methyl isobutyrate (MIB). Preferably, the liquid phase is at a temperature from 40 to 120° C.; preferably at least 50° C., preferably at least 60° C.; preferably no more than 110° C., preferably no more than 100° C. Preferably, the catalyst bed is at a pressure from 0 to 2000 psig (101 kPa to 14 MPa); preferably no more than 2000 kPa, preferably no more than 1500 kPa.

The OER typically produces MMA, along with methacrylic acid and unreacted methanol. Without base neutralization, the OER reactor generally has a pH ranging from 3 to 7, such as, for example, from 4 to 5. Optionally, the acidic environment can be neutralized with a base, such as, for example, sodium hydroxide. Preferably, the catalyst of the present invention maintains a high activity for a long period of time when in use as an oxidative esterification reaction catalyst in either an acidic or basic environment. Preferably, MMA is produced without adding a base to neutralize the acidic environment.

Preferably, the attrition of the catalyst is less than 15 wt % after three days, as measured by the process defined herein. As used herein, "attrition" is the amount in weight lost by the catalyst measured by loading 1 g of catalyst particles loaded in 12 ml of 1 wt % methacrylic acid –10 wt % water in methanol in a 20 ml Parr bottle, shaking the bottle at 60 rpm for 3 days at 80° C., and measuring the weight loss of the original sample by weighing the fines generated. More preferably, the attrition of the catalyst is less than 12 wt % after three days, even more preferably less than 10 wt % after three days, still more preferably less than 8 wt %, and yet more preferably less than 6 wt % after three days.

Preferably, methanol and methacrolein are fed to the reactor in a methanol:methacrolein molar ratio from 1:10 to 100:1, preferably from 1:2 to 20:1, preferably from 1:1 to 10:1. Preferably, a catalyst bed further comprises inert materials above and/or below the catalyst. Preferred inert materials include, e.g., alumina, clay, glass, silica carbide and quartz. Preferably, the inert material has an average diameter equal to or greater than that of the catalyst, preferably no greater than 20 mm Preferably, the reaction products are fed to a methanol recovery distillation column which provides an overhead stream rich in methanol and methacrolein; preferably this stream is recycled back to the OER. The bottoms stream from the methanol recovery distillation column comprises MMA, MDA, methacrylic acid, salts and water. In one embodiment of the invention, MDA is hydrolyzed in a medium comprising MMA, MDA, methacrylic acid, salts and water. MDA may be hydrolyzed in the bottoms stream from a methanol recovery distillation column; said stream comprising MMA, MDA, methacrylic acid, salts and water. In another embodiment, MDA is hydrolyzed in an organic phase separated from the methanol recovery bottoms stream. It may be necessary to add water to the organic phase to ensure that there is sufficient water for the MDA hydrolysis; these amounts may be determined easily from the composition of the organic phase. The product of the MDA hydrolysis reactor is phase separated and the organic phase passes through one or more distillation columns to produce MMA product and light and/or heavy byproducts. In another embodiment, hydrolysis could be conducted within the distillation column itself.

One preferred embodiment is a recycle reactor with cooling capacity in the recycle loop. Another preferred embodiment is a series of reactors with cooling and mixing capacity between the reactors.

Preferably, oxygen concentration at a reactor outlet is at least 0.5 mole %, preferably at least 2 mole %, preferably at least 3 mole %; preferably no more than 7 mole %, preferably no more than 6.5 mole %, preferably no more than 6 mole %.

One preferred embodiment of the fixed bed reactor for oxidative esterification is a trickle bed reactor, which contains a fixed bed of catalyst and passes both the gas and liquid feeds through the reactor in the downward direction. In trickle flow, the gas phase is the continuous fluid phase. Thus, the zone at the top of the reactor, above the fixed bed, will be filled with a vapor phase mixture of nitrogen, oxygen, and the volatile liquid components at their respective vapor pressures. Under typical operating temperatures and pressures (50-90° C. and 60-300 psig (400-2000 kPa)), this vapor mixture is inside the flammable envelope if the gas feed is air. Thus, only an ignition source would be required to initiate a deflagration, which could lead to loss of primary containment and harm to the physical infrastructure and personnel in the vicinity. In order to address process safety considerations, a means to operate a trickle bed reactor while avoiding a flammable headspace atmosphere is operation with a gas feed containing a sufficiently low oxygen mole fraction to ensure the oxygen concentration in the vapor headspace is below the limiting oxygen concentration (LOC).

Knowledge of the LOC is required for the fuel mixture, temperature, and pressure of concern. Since the LOC decreases with increasing temperature and pressure, and given that methanol gives a lower LOC than the other two significant fuels (methacrolein and methyl methacrylate), a conservative design chooses a feed oxygen to nitrogen ratio that ensures a composition with less than the LOC at the highest expected operating temperature and pressure. For example, for a reactor operated at up to 100° C. and 275 psig (2 MPa), the feed oxygen concentration in nitrogen should not exceed 7.4 mol %.

EXAMPLES

Experimental Procedures

Catalytic Tests in Slurry Reactor

Prior to slurry reactor tests catalysts pellets were crushed and sieved to 120-400 mesh size.

In a typical experiment 1.0 g of catalyst were loaded together with 120-160 g of 10 wt % methacrolein (MA) in methanol in the reactors under ambient conditions. The reaction was carried out at 80° C. and 100 psig (689 kPa) with 100 sccm of 8.5% O2 flow (40 sccm synthetic air and 60 sccm of pure $N_2$). Agitation of the reaction mixture was done by a propeller at 1150 rpm. The reaction time was 100 min with samples taken every 25 min. The liquid samples were analyzed by offline GC with an external calibration method. Mass balance was 100±5%. The production rate (space time yield) of the methyl methacrylate (MMA) was calculated from the slope of moles of the MMA plotted versus time as reported in mol/kg_cat/h. MMA selectivity (%) is defined as ratio of molar rate of MMA to the sum of molar rates of all methacrolein-derived products (not including dimethyl acetal) times 100%.

Catalytic Tests in Fixed Bed Reactor

The fixed bed reactor was a ¼ inch (6.35 mm) tube of ~36 inches (91.4 cm) in length. The fixed bed reactor was loaded by pouring 1 mm glass beads into the top of the vertically aligned tube (~12 inches length (30.5 cm)). After that, the catalyst was loaded typically with 1-2 g of catalyst in the form of extrudates. The remainder was filled with 3 mm glass beads.

The reactor operated as a packed bubble column Liquid was continually pumped from the holding vessel (which holds 150 g of feed at the start of an experiment) through the reactor at 7 mL/min and then back into the vessel. As such, the reactor operates as a batch reactor in the liquid phase reagents. The gas flow was single-pass, with continuous feed of 7.7 vol % O2 in nitrogen through the reactor and out the condenser.

The composition of the holding vessel was regularly monitored by sampling and analysis on an online Agilent GC. Test conditions: 60° C., 150 psig (1034 kPa), 100 sccm of 7.7% O2, 10 wt % Methacrolein solution in MeOH.

Mass balance was 100±5%. The production rate (space time yield) of the methyl methacrylate (MMA) was calculated as moles of the MMA converted over time per catalyst mass and reported in mol/kg_cat/h. MMA selectivity (%) is defined as ratio of molar rate of MMA to the sum of molar rates of all methacrolein-derived products (not including dimethyl acetal) times 100%.

Eggshell Catalysts

Au/SiC, Au/Zr—SiC and Au/Ti—SiC catalysts were prepared by incipient wetness impregnation using sodium aurothiomalate(I) as source of Au and it was observed that the gold formed an eggshell layer of approximately 50 to 100 μm thick in the Au/SiC and Au/Zr—SiC catalysts, while for Au/Ti—SiC a uniform distribution of gold across the catalyst particle was observed. The performance of Au/Zr—SiC and Au/Ti—SiC were comparable in the fixed bed.

To measure attrition, 1 g of catalyst sample was loaded in 12 ml of 1 wt % methacrylic acid –10 wt % water in methanol in a 20 ml Parr bottle, the bottle was shaken at 60 rpm for 3 days, and the weight loss of the original sample was measured by weighing the fines generated.

Chemical stability of supports was assessed under acidic conditions. 0.5 g of support was loaded together with 10 g of 1 wt % methacrylic acid solution in methanol and stirred at 50° C. for 7 days. The solids were filtered, and the solution was analyzed by ICP for leached elements. If no elements were leached the support is marked as stable.

TABLE 1

| Attrition and chemical stability properties of supports | | |
|---|---|---|
| Support Material | Attrition measured after 3 days [wt %]* | Stable under acidic conditions** |
| SiC (3 mm) | <5 | yes |
| TiC—SiC (3 mm) | <10 | yes |
| Meso-C ™ (3 mm) | 14 | yes |
| NORPRO ® TiO₂ ST61120 (3 mm) | 92 | yes |
| NORPRO ® TiO₂ ST31119 (3 mm) | 75 | yes |
| NORPRO ® ZrO₂ SZ31164 (3 mm) | 35 | yes |
| NORPRO ® γ-Al₂O₃ (3.2 mm) | 14 | no |

Slurry Reactor Examples

Example #1 1.5 wt % Au/SiC 1.5 wt % Au/SiC catalyst was prepared by incipient wetness impregnation followed by drying and calcination in air using a box oven equipped with air purge.

Gold (III) acetate was used as source of Au. A stock solution in deionized (DI) water (Heraeus, 3.326% Au) was used. The stock solution was diluted with DI water to prepare an impregnation solution.

SiC was used as support (SiC #1 from SiCat Catalyst, 3 mm extrudates (cylinders), BET surface area 29 m²/g, pore volume 0.48 cm³/g (by Hg intrusion), avg. pore width 12.4 nm, pore volume for incipient wetness impregnation determined by DI water 0.4 cm³/g).

The 5 g support was impregnated with 4 ml of the impregnation solution dropwise until incipient wetness point targeting Au loading 1.5 wt %. The impregnated catalyst was dried and calcined in air in the box oven using the following procedure: room temperature (RT)→120° C. at 5° C./min, dwell 1 h, 120→300° C. at 5° C./min, dwell for 4 h, cool down to room temperature in 2 h.

Example #2 1.5 wt % Au/SiC 1.5 wt % Au/SiC catalyst was prepared by incipient wetness impregnation followed by drying and calcination in air using a box oven equipped with air purge.

Gold (III) acetate was used as source of Au. The same preparation as in Example 1 was used but the support was SiC #4 from SiCat Catalyst (3 mm extrudates (cylinders), BET surface area 31 m²/g, pore volume 0.54 cm³/g (by Hg intrusion), avg. pore width 10.8 nm, pore volume for incipient wetness impregnation determined by DI water 0.4 cm³/g).

Example #3 1.5 wt % Au/SiC 1.5 wt % Au/SiC catalyst was prepared by incipient wetness impregnation followed by drying and calcination in air using a box oven equipped with air purge.

Sodium aurothiomalate(I) was used as source of Au to prepare a stock solution. 0.1988 M sodium aurothiomalate(I) (MW=390.08 g/mol) in DI water was prepared by placing 3.877 g of sodium aurothiomalate(I) in 50 ml volumetric flask and filling up with DI water till 50 ml volume. The flask was gently shaken until a transparent yellow solution was formed.

An impregnation solution was prepared by mixing 38.3 ml of the 0.1988 M sodium aurothiomalate(I) stock solution 1.7 ml of DI water until a transparent yellow solution was formed.

5 g of SiC support same as in Example 1 were impregnated with 2 ml of the impregnation solution dropwise until incipient wetness point.

The impregnated material was dried and calcined in air in the box oven using the following procedure: RT→120° C. at 5° C./min, dwell 1 h, 120→300° C. at 5° C./min, dwell for 4 h, cool down to room temperature in 2 h.

Example #4 0.4 wt % Au/SiC 0.4 wt % Au/SiC catalyst was prepared by incipient wetness impregnation followed by drying and calcination in air using a box oven equipped with air purge.

Sodium aurothiomalate(I) was used as source of Au. The same SiC support and preparation method as in Example 3 was used, but the target gold loading was 0.4 wt % was achieved by adjusting the concentration of the impregnation solution accordingly.

Example #5 1.5 wt % Au/SiC 1.5 wt % Au/SiC was prepared by incipient wetness impregnation followed by drying and calcination in air using a box oven equipped with air purge.

Sodium aurothiomalate(I) was used as source of Au. The same preparation method as in Example 3 was used, but the support was SiC #4 from SiCat Catalyst (3 mm extrudates (cylinders), BET surface area 31 $m^2/g$, pore volume 0.54 $cm^3/g$ (by Hg intrusion), avg. pore width 10.8 nm, pore volume for incipient wetness impregnation determined by DI water 0.4 $cm^3/g$).

Example #6 1.5 wt % Au/SiC 1.5 wt % Au/SiC was prepared by incipient wetness impregnation followed by drying and calcination in air using a box oven equipped with air purge.

Sodium aurothiomalate(I) was used as source of Au. The same preparation method as in Example 3 was used, but the support was SiC DA0594 from SiCat Catalyst (1 mm extrudates (cylinders), BET surface area 20 $m^2/g$, avg. pore width 15.1 nm, pore volume for incipient wetness impregnation determined by DI water 0.4 $cm^3/g$).

Example #7 1.5 wt % Au/SiC 1.5 wt % Au/SiC was prepared by incipient wetness impregnation followed by drying and calcination in air using a box oven equipped with air purge.

Sodium aurothiomalate(I) was used as source of Au. The same preparation method as in Example 3 was used, but the support was SiC SB0700C from SiCat Catalyst (1 mm extrudates (cylinders), BET surface area 19 $m^2/g$, avg. pore width 13.7 nm, pore volume for incipient wetness impregnation determined by DI water 0.4 $cm^3/g$).

Example #8 1.5 wt % Au/SiC 1.5 wt % Au/SiC was prepared by incipient wetness impregnation followed by drying and calcination in air using a box oven equipped with air purge.

Sodium aurothiomalate(I) was used as source of Au. The same preparation method as in Example 3 was used, but the support was SiC SB0700G from SiCat Catalyst (1 mm extrudates (cylinders), BET surface area 28 $m^2/g$, avg. pore width 13.6 nm, pore volume for incipient wetness impregnation determined by DI water 0.4 $cm^3/g$).

Example #9 1.5 wt % Au/SiC 1.5 wt % Au/SiC was prepared by incipient wetness impregnation followed by drying and calcination in air using a box oven equipped with air purge.

Sodium aurothiomalate(I) was used as source of Au. The same preparation method as in Example 3 was used, but the support was SiC SD0050A from SiCat Catalyst (1 mm extrudates (cylinders), BET surface area 24 $m^2/g$, avg. pore width 12.3 nm, pore volume for incipient wetness impregnation determined by DI water 0.4 $cm^3/g$).

Example #10 1.5 wt % Au/Pre-Calcined SiC 1.5 wt % Au/pre-calcined SiC was prepared by incipient wetness impregnation followed by drying and calcination in air using a box oven equipped with air purge.

Sodium aurothiomalate(I) was used as source of Au. The same preparation method as in Example 3 was used, but the support was SiC #1 pre-calcined on air for 4 h at 600° C. (temperature ramping rate 5° C./min).

Pre-calcined SiC #1 support has BET surface area of 26 $m^2/g$.

Example #11 1 wt % Au/SiC 1 wt % Au/SiC was prepared by incipient wetness impregnation followed by drying and calcination in air using a box oven equipped with air purge.

Sodium aurothiomalate(I) was used as source of Au. The same SiC support and preparation as in Example 9 was used, but the target gold loading was 1 wt % which was achieved by adjusting the concentration of the impregnation solution accordingly. The impregnated catalyst was dried and calcined on air using the following procedure:

RT→120° C. at 1° C./min, dwell 1 h, 120→300° C. at 1° C./min, dwell for 4 h, cool down to room temperature in 2 h.

Example #12 1 wt % Au/SiC 1 wt % Au/SiC was prepared by incipient wetness impregnation followed by drying and calcination in air using a box oven equipped with air purge.

Sodium aurothiomalate(I) was used as source of Au. The same SiC support and preparation as in Example 9 was used, but the target gold loading was 1 wt % which was achieved by adjusting the concentration of the impregnation solution accordingly. The impregnated catalyst was dried and calcined on air using the following procedure: RT→120° C. at 5° C./min, dwell 1 h, 120→300° C. at 5° C./min, dwell for 4 h, cool down to room temperature in 2 h.

Example #13 1 wt % Au/SiC 1 wt % Au/SiC was prepared by incipient wetness impregnation followed by drying and calcination in air using a box oven equipped with air purge.

Sodium aurothiomalate(I) was used as source of Au. The same SiC support and preparation as in Example 9 was used, but the target gold loading was 1 wt % which was achieved by adjusting the concentration of the impregnation solution accordingly. The impregnated catalyst was dried and calcined on air using the following procedure: RT→120° C. at 20° C./min, dwell 1 h, 120→300° C. at 20° C./min, dwell for 4 h, cool down to room temperature in 2 h.

Example #14 1 wt % Au/SiC 1 wt % Au/SiC was prepared by incipient wetness impregnation followed by drying and calcination in air using a box oven equipped with air purge.

Sodium aurothiomalate(I) was used as source of Au. The same SiC support and preparation as in Example 9 was used, but the target gold loading was 1 wt % which was achieved by adjusting the concentration of the impregnation solution accordingly. The impregnated catalyst was dried and calcined on air using the following procedure: RT→120° C. at 5° C./min, dwell 1 h, 120→500° C. at 5° C./min, dwell for 4 h, cool down to room temperature in 2 h.

Example #15 1.5 wt % Au/TiC—SiC 1.5 wt % Au/TiC—SiC was prepared by incipient wetness impregnation followed by drying and calcination in air using a box oven equipped with air purge.

Sodium aurothiomalate(I) was used as source of Au. The same preparation as in Example 3 was used, but the support was mesoporous mixed carbide TiC—SiC from SiCat Catalyst (3 mm extrudates (cylinders), BET surface area 87 m²/g, pore volume 0.35 cm³/g (by Hg intrusion), avg. pore width 4.4 nm, pore volume for incipient wetness impregnation determined by DI water 0.5 cm³/g).

Example #16 1.5 wt % Au/TiC—SiC 1.5 wt % Au/TiC—SiC was prepared by incipient wetness impregnation followed by drying and calcination in air using a box oven equipped with air purge.

Sodium aurothiomalate(I) was used as source of Au. The same preparation as in Example 3 was used, but the support was mesoporous mixed carbide TiC—SiC from SiCat Catalyst (1 mm extrudates (cylinders), BET surface area 69 m²/g, avg. pore width 5.0 nm, pore volume for incipient wetness impregnation determined by DI water 0.5 cm³/g).

Example #17 1.5 wt % Au/Pre-Calcined TiC—SiC 1.5 wt % Au/pre-calcined TiC—SiC was prepared by incipient wetness impregnation followed by drying and calcination in air using a box oven equipped with air purge.

Sodium aurothiomalate(I) was used as source of Au. The same preparation as in Example 3 was used, but the support was mesoporous mixed carbide TiC—SiC from SiCat Catalyst pre-calcined for 4 h at 500° C. on air (temperature ramping rate 5° C./min.

Pre-calcined TiC—SiC support has BET surface area of 23.5 m²/g and avg. pore width of 10 nm.
Promoted Au/X—SiC Catalysts

Example #18 1.5 wt % Au/Zr—SiC a) Preparation of SiC Support Promoted with Zr "Zr—SiC"

The coated support was prepared by impregnation-evaporation (RotaVap) method. 10 g of SiC extrudates same as in Example 1 were loaded in a round bottom flask followed by 22 ml of 0.5 M Zirconium(IV) oxynitrate hydrate (MW=231.23 g/mol (anhydrous basis), ZrO(NO₃)₂*xH₂O) solution in DI water. The flask was placed on a RotaVap. Water was removed under vacuum at continuous flask rotation at 45-50° C. The as-prepared support was dried under vacuum for 30 min at 45-50° C. and then calcined on air in the box oven using the following procedure: RT→120° C. at 3° C./min, dwell 2 h, 120→600° C. at 2° C./min, dwell for 4 h, cool down to room temperature in 2 h.

The as-promoted SiC support contains ~6.9 wt % of Zr (in the form of oxide). Zr—SiC support has BET surface area of 32 m²/g and avg. pore width of 12.5 nm.
b) Preparation of 1.5 wt % Au/Zr—SiC The catalyst was prepared by incipient wetness impregnation followed by drying and calcination in air using a box oven equipped with air purge.

Sodium aurothiomalate(I) was used as source of Au. The same preparation as in Example 3 was used, but the support was Zr—SiC.

Example #19 1.5 wt % Au/Ti—SiC a) Preparation of SiC Support Promoted with Ti "Ti—SiC"

The same SiC support and preparation method were used as in Example 18-a, but, instead of 22 ml zirconium(IV) oxynitrate hydrate solution, 5.3 ml of commercially available 50 wt % titanium(IV) bis(ammonium lactato)dihydroxide solution (MW=294.08 g/mol, [CH₃CH(O—)CO₂

NH₄]₂Ti(OH)₂, solution contains Ti(IV) in C=2.077 M) in DI water were used+16 ml DI water for 10 g of support.

The as-promoted SiC support contains ~4.0 wt % of Ti (in the form of oxide). Ti—SiC support has BET surface area of 33 m²/g and avg. pore width of 9.3 nm.
b) Preparation of 1.5 wt % Au/Ti—SiC The catalyst was prepared by incipient wetness impregnation followed by drying and calcination in air using a box oven equipped with air purge.

Sodium aurothiomalate(I) was used as source of Au. The same preparation was used as in Example 3, but the support was Ti—SiC.

Example #20 1.2 wt % Au/Sc—SiC a) Preparation of SiC Support Promoted with Sc "Sc—SiC"

The same SiC support and preparation method were used as in Example 18-a, but, instead of 22 ml zirconium(IV) oxynitrate hydrate solution, 11 ml of 1M Scandium nitrate hydrate (MW=230.97 g/mol (anhydrous basis) Sc(NO₃)₃*xH₂O) solution in DI water+20 ml were used for 10 g of support.

The as-promoted SiC support contains ~2.6 wt % of Sc (in the form of oxide). Sc—SiC support has BET surface area of 27 m²/g and avg. pore width of 11.8 nm.
b) Preparation of 1.2 wt % Au/Sc—SiC The catalyst was prepared by incipient wetness impregnation followed by drying and calcination in air using a box oven equipped with air purge.

Sodium aurothiomalate(I) was used as source of Au. The same preparation was used as in Example 3, but the support was Sc—SiC.

Example #21 1.6 wt % Au/Y—SiC a) Preparation of SiC Support Promoted with Y "Y—SiC"

The same SiC support and preparation method were used as in Example 18-a, but, instead of 22 ml zirconium(IV) oxynitrate hydrate solution, 7.33 ml of 1.5 M Yttrium(III) nitrate hexahydrate (MW=383.01 g/mol, N₃O₉Y*6H₂O) solution in DI water+20 ml of DI water were used for 10 g of support.

The as-promoted SiC support contains ~7.1 wt % of Y (in the form of oxide). Y—SiC support has BET surface area of 24 m²/g and avg. pore width of 9.5 nm.
b) Preparation of 1.6 wt % Au/Y—SiC The catalyst was prepared by incipient wetness impregnation followed by drying and calcination in air using a box oven equipped with air purge.

Sodium aurothiomalate(I) was used as source of Au. The same preparation was used as in Example 3, but the support was Y—SiC.

Example #22 1.7 wt % Au/La—SiC a) Preparation of SiC Support Promoted with La "La—SiC"

The same SiC support and preparation method were used as in Example 18-a, but, instead of 22 ml zirconium(IV) oxynitrate hydrate solution, 17.7 ml of 0.623 M Lanthanum (III) nitrate hexahydrate (MW=433.01 g/mol, La(NO₃)₃·6H₂O) solution in DI water+20 ml of DI water were used for 10 g of support.

The as-promoted SiC support contains ~11.5 wt % of La (in the form of oxide). La—SiC support has BET surface area of 15 m²/g and avg. pore width of 13.4 nm.

b) Preparation of 1.7 wt % Au/La—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was La—SiC.

Example #23 1.3 wt % Au/V—SiC a) Preparation of SiC Support Promoted with V "V—SiC"

10 g of SiC support same as in Example 1 were placed in 300 ml flat bottom flask equipped overhead stirrer. 275 ml of 0.04 M Ammonium metavanadate (MW=116.98 g/mol, $NH_4VO_3$) solution in DI water were added and the slurry was stirred overnight at room temperature. The liquid was decanted and the coated SiC extrudates were dried and calcined using the procedure same as in Example 18-a.

The as-promoted SiC support contains ~0.2 wt % of V (in the form of oxide). V—SiC support has BET surface area of 25 $m^2$/g and avg. pore width of 12.8 nm.

b) Preparation of 1.3 wt % Au/V—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was V—SiC.

Example #24 1.2 wt % Au/Nb—SiC a) Preparation of SiC Support Promoted with Nb "Nb—SiC"

The coated support was prepared by incipient wetness impregnation. For this 20 g of SiC extrudates same as in Example 1 were placed in round bottom flask and impregnated with 10 ml of 0.3 M Ammonium niobate(V) oxalate hydrate (MW=302.98 (anhydrous basis), $C_4H_4NNbO_9 \cdot xH_2O$) solution in DI water until constant shaking on a shaker. The as prepared sample was dried and calcined using the procedure as for Example 18-a.

The as-promoted SiC support contains ~0.9 wt % of Nb (in the form of oxide). Nb—SiC support has BET surface area of 26 $m^2$/g and avg. pore width of 11.4 nm.

b) Preparation of 1.2 wt % Au/Nb—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Nb—SiC.

Example #25 1.5 wt % Au/Cr—SiC a) Preparation of SiC Support Promoted with Cr "Cr—SiC"

The same SiC support and preparation method were used as Example 18-a, but, instead of 22 ml zirconium(IV) oxynitrate hydrate solution, 11 ml of 1 M Chromium (III) nitrate nonahydrate (MW=400.14 g/mol, $Cr(NO_3)_3 \cdot 9H_2O$) in DI water+10 ml of DI water were used for 10 g of support.

The as-promoted SiC support contains ~4.6 wt % of Cr (in the form of oxide). Cr—SiC support has BET surface area of 23 $m^2$/g and avg. pore width of 12.0 nm.

b) Preparation of 1.5 wt % Au/Cr—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Cr—SiC.

Example #26 1.3 wt % Au/Mn—SiC a) Preparation of SiC Support Promoted with Mn "Mn—SiC"

The same SiC support and preparation method were used as Example 18-a, but instead of 22 ml zirconium(IV) oxynitrate hydrate solution, 5.5 ml of 2M Manganese(II) nitrate tetrahydrate (MW=251.01 g/mol, $Mn(NO_3)_2*4H_2O$) solution in DI water+15 ml of DI water were used for 10 g of support.

The as-promoted SiC support contains ~2.5 wt % of Mn (in the form of oxide). Mn—SiC support has BET surface area of 22 $m^2$/g and avg. pore width of 13.1 nm.

b) Preparation of 1.3 wt % Au/Mn—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Mn—SiC.

Example #27 1.2 wt % Au/Fe—SiC a) Preparation of SiC Support Promoted with Fe "Fe—SiC"

The same SiC support and preparation method were used as Example 18-a, but instead of 22 ml zirconium(IV) oxynitrate hydrate solution, 11 ml of 1M hon (III) nitrate nonahydrate (MW=403.99 g/mol, $Fe(NO_3)_3*9H_2O$) solution in DI water+10 ml of DI water were used for 10 g of support.

The as-promoted SiC support contains ~4.3 wt % of Fe (in the form of oxide). Fe—SiC support has BET surface area of 26 $m^2$/g and avg. pore width of 12.9 nm.

b) Preparation of 1.2 wt % Au/Fe—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Fe—SiC.

Example #28 1.3 wt % Au/Co—SiC a) Preparation of SiC Support Promoted with Co "Co—SiC"

The same SiC support and preparation method were used as Example 18-a, but instead of 22 ml zirconium(IV) oxynitrate hydrate solution, 11 ml of 1M Cobalt (II) nitrate hexahydrate (MW=291.04 g/mol, $Co(NO_3)_2*6H_2O$) solution in DI water were used for 10 g of support.

The as-promoted SiC support contains ~5.1 wt % of Co (in the form of oxide). Co—SiC support has BET surface area of 22 $m^2$/g and avg. pore width of 13.6 nm.

b) Preparation of 1.3 wt % Au/Co—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Co—SiC.

15

Example #29 1.4 wt % Au/Ni—SiC a) Preparation of SiC Support Promoted with Ni "Ni—SiC"

The same SiC support and preparation method were used as Example 18-a, but instead of 22 ml zirconium(IV) oxynitrate hydrate solution, 11 ml of 1M Nickel (II) nitrate hexahydrate (MW=290.8 g/mol, $Ni(NO_3)_2*6H_2O$) solution in DI water were used for 10 g of support.

The as-promoted SiC support contains ~5.1 wt % of Ni (in the form of oxide). Ni—SiC support has BET surface area of 28 $m^2/g$ and avg. pore width of 12.5 nm.

b) Preparation of 1.4 wt % Au/Ni—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Ni—SiC.

Example #30 1.3 wt % Au/Al—SiC a) Preparation of SiC Support Promoted with Al "Al—SiC"

The same SiC support and preparation method were used as Example 18-a, but instead of 22 ml zirconium(IV) oxynitrate hydrate solution, 7.33 ml of 1.5M Aluminum(III) nitrate nonahydrate (MW=375.13 g/mol, $Al(NO_3)_3*9H_2O$) solution in DI water were used for 10 g of support.

The as-promoted SiC support contains ~3.2 wt % of Al (in the form of oxide). Al—SiC support has BET surface area of 31 $m^2/g$ and avg. pore width of 10.7 nm.

b) Preparation of 1.3 wt % Au/Al—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Al—SiC.

Example #31 1.4 wt % Au/Ga—SiC a) Preparation of SiC Support Promoted with Ga "Ga—SiC"

The same SiC support and preparation method were used as Example 18-a, but instead of 22 ml zirconium(IV) oxynitrate hydrate solution, 5.5 ml of 2M Gallium(III) nitrate hydrate (MW=282.74 g/mol, $Ga(NO_3)_3*xH_2O$) solution in DI water were used for 10 g of support.

The as-promoted SiC support contains ~4.4 wt % of Ga (in the form of oxide). Ga—SiC support has BET surface area of 28 $m^2/g$ and avg. pore width of 13.9 nm.

b) Preparation of 1.4 wt % Au/Ga—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Ga—SiC.

Example #32 1.4 wt % Au/In—SiC a) Preparation of SiC Support Promoted with in "In—SiC"

The same SiC support and preparation method were used as Example 18-a, but instead of 22 ml zirconium(IV) oxynitrate hydrate solution, 7.33 ml of 1.5M Indium(III) nitrate hydrate (MW=327.83 g/mol, $In(NO_3)_3*xH_2O$) solution in DI water were used for 10 g of support.

The as-promoted SiC support contains ~12.9 wt % of In (in the form of oxide). In—SiC support has BET surface area of 21 $m^2/g$ and avg. pore width of 14.4 nm.

b) Preparation of 1.4 wt % Au/In—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was In—SiC.

Example #33 1.5 wt % Au/Ce—SiC a) Preparation of SiC Support Promoted with Ce "Ce—SiC"

The same SiC support and preparation method were used as Example 18-a, but instead of 22 ml zirconium(IV) oxynitrate hydrate solution, 7.33 ml of 1.5 M Cerium (IV) nitrate hexahydrate (MW=434.23 g/mol, $Ce(NO_3)_4*6H_2O$) solution in DI water were used for 10 g of support.

The as-promoted SiC support contains ~12.7 wt % of Ce (in the form of oxide). Ce—SiC support has BET surface area of 35 $m^2/g$ and avg. pore width of 11.2 nm.

b) Preparation of 1.5 wt % Au/Ce—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Ce—SiC.

Example #34 1.3 wt % Au/Sn—SiC a) Preparation of SiC Support Promoted with Sn "Sn—SiC"

The same SiC support and preparation method were used as Example 18-a, but instead of 22 ml zirconium(IV) oxynitrate hydrate solution, 50 ml of 0.04 M Tin(II) oxalate/EDTA solution in DI water were used for 10 g of support.

For preparation of Tin(II) oxalate/EDTA solution, 0.413 g of Tin (II) oxalate (MW=206.72 g/mol, $SnC_2O_4$) and 0.58 g of Ethylenedinitrilo)tetraacetic acid (EDTA) (MW=292.24 g/mol) were placed in a beaker followed by addition of 50 ml DI water. The pH of the slurry was adjusted to ~6 by addition of 25 wt % ammonium hydroxide in DI water. The as prepared solution has 0.04 M Tin(II) oxalate and 0.04 M EDTA.

The as-promoted SiC support contains ~1.3 wt % of Sn (in the form of oxide). Sn—SiC support has BET surface area of 26 $m^2/g$ and avg. pore width of 14.1 nm.

b) Preparation of 1.3 wt % Au/Sn—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Sn—SiC.

Example #35 1 wt % Au/Pb—SiC a) Preparation of SiC Support Promoted with Pb "Pb—SiC"

The same SiC support and preparation method were used as Example 24-a, but instead of 10 ml Ammonium niobate (V) oxalate hydrate solution, 5 ml of 1M Lead(II) nitrate (MW=331.2 g/mol, $Pb(NO_3)_2$) solution in DI water were used for impregnation of 10 g of SiC support.

The as-promoted SiC support contains ~5.6 wt % of Pb (in the form of oxide). Pb—SiC support has BET surface area of 18 $m^2/g$ and avg. pore width of 15.5 nm.

b) Preparation of 1 wt % Au/Pb—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Pb—SiC.

Example #36 1.2 wt % Au/Bi—SiC a) Preparation of SiC Support Promoted with Bi "Bi—SiC"

The same SiC support and preparation method were used as Example 24-a, but instead 10 ml Ammonium niobate(V) oxalate hydrate solution, 5 ml of 0.5M Bismuth(II) nitrate solution in 3M citric acid was used for impregnation of 10 g of SiC support.

For preparation of Bismuth(III) nitrate solution 6.06 g of Bismuth(III) nitrate pentahydrate (MW=485.07 g/mol, $Bi(NO_3)_3*5H_2O$) were placed in a beaker equipped with magnetic stir bar followed by 25 ml of 3M citric acid in DI water. The slurry was vigorously stirred at room temperature and 25 wt % ammonium hydroxide solution in DI water was added dropwise to it until the transparent solution was formed.

The as-promoted SiC support contains ~3 wt % of Bi (in the form of oxide). Bi—SiC support has BET surface area of 25 $m^2$/g and avg. pore width of 15.0 nm.

b) Preparation of 1.2 wt % Au/Bi—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Bi—SiC.

Example #37 Non-promoted 1.2 wt % Au/SiC 1.2 wt % Au/SiC catalyst was prepared by incipient wetness impregnation followed by drying and calcination in air using a box oven equipped with air purge.

Sodium aurothiomalate(I) was used as source of Au. The same SiC support and preparation method as in Example 3, the target gold loading of 1.2 wt % was achieved by adjusting the concentration of the impregnation solution accordingly.

TABLE 2

Catalytic data for Examples tested in slurry reactor.

| Example | Reactor type | Au loading [wt %] | Promoter | Promoter loading [wt %] | Support | MMA Space time yield, mol/kg_cat/h | MMA sel. (%) |
|---|---|---|---|---|---|---|---|
| 1 | Slurry | 1.5 | — | — | SiC | 19.2 | 99 |
| 2 | Slurry | 1.5 | — | — | SiC | 10.2 | >99 |
| 3 | Slurry | 1.5 | — | — | SiC | 21.0 | 99 |
| 4 | Slurry | 0.4 | — | — | SiC | 5.0 | >99 |
| 5 | Slurry | 1.5 | — | — | SiC | 22.6 | >99 |
| 6 | Slurry | 1.5 | — | — | SiC | 18.4 | >99 |
| 7 | Slurry | 1.5 | — | — | SiC | 21.0 | >99 |
| 8 | Slurry | 1.5 | — | — | SiC | 21.2 | >99 |
| 9 | Slurry | 1.5 | — | — | SiC | 25.0 | >99 |
| 10 | Slurry | 1.5 | — | — | SiC calcined at 600° C./ 4 h | 17.3 | >99 |

TABLE 2-continued

Catalytic data for Examples tested in slurry reactor.

| Example | Reactor type | Au loading [wt %] | Promoter | Promoter loading [wt %] | Support | MMA Space time yield, mol/kg_cat/h | MMA sel. (%) |
|---|---|---|---|---|---|---|---|
| 11 | Slurry | 1 | — | — | SiC | 25.7 | 99 |
| 12 | Slurry | 1 | — | — | SiC | 23.3 | >99 |
| 13 | Slurry | 1 | — | — | SiC | 24.3 | >99 |
| 14 | Slurry | 1 | — | — | SiC | 18.0 | >99 |
| 15 | Slurry | 1.5 | — | — | TiC—SiC | 17.8 | 99 |
| 16 | Slurry | 1.5 | — | — | TiC—SiC | 22.5 | >99 |
| 17 | Slurry | 1.5 | — | — | TiC—SiC calcined 500/4 h | 22.0 | >99 |
| 18 | Slurry | 1.5 | Zr | 6.9 | Zr—SiC | 27.3 | 99 |
| 19 | Slurry | 1.5 | Ti | 4.0 | Ti—SiC | 30.6 | 99 |
| | Slurry | 1.2 | Sc | 2.6 | Sc—SiC | 26.5 | >99 |
| 21 | Slurry | 1.6 | Y | 7.1 | Y—SiC | 25.6 | 98 |
| 22 | Slurry | 1.7 | La | 11.5 | La—SiC | 29.3 | 99 |
| 23 | Slurry | 1.3 | V | 0.2 | V—SiC | 16.1 | >99 |
| 24 | Slurry | 1.2 | Nb | 0.9 | Nb—SiC | 19.2 | >99 |
| 25 | Slurry | 1.5 | Cr | 4.6 | Cr—SiC | 14.3 | >99 |
| 26 | Slurry | 1.6 | Mn | 5.1 | Mn—SiC | 22.1 | 98 |
| 27 | Slurry | 1.2 | Fe | 4.3 | Fe—SiC | 12.1 | 99 |
| 28 | Slurry | 1.3 | Co | 5.1 | Co—SiC | 13.2 | >99 |
| 29 | Slurry | 1.4 | Ni | 5.1 | Ni—SiC | 21.8 | >99 |
| 30 | Slurry | 1.3 | Al | 3.2 | Al—SiC | 23.5 | >99 |
| 31 | Slurry | 1.4 | Ga | 4.4 | Ga—SiC | 27.1 | >99 |
| 32 | Slurry | 1.4 | In | 12.9 | In—SiC | 31.6 | 98 |
| 33 | Slurry | 1.5 | Ce | 12.7 | Ce—SiC | 37.0 | 98 |
| 34 | Slurry | 1.3 | Sn | 1.3 | Sn—SiC | 22.9 | 98 |
| 35 | Slurry | 1 | Pb | 5.6 | Pb—SiC | 10.0 | >99 |
| 36 | Slurry | 1.2 | Bi | 3 | Bi—SiC | 16.3 | >99 |
| 37 | Slurry | 1.2 | — | — | SiC | 19.7 | >99 |

Fixed Bed Reactor Examples

Example #38 Non-promoted 1.5 wt % Au/SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 3. Support size was 3 mm extrudates (cylinders).

Example #39 1.5 wt % Au/Zr—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 18. Support size was 3 mm extrudates (cylinders).

Example #40 1.5 wt % Au/Ti—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 19. Support size was 3 mm extrudates (cylinders).

Example #41 1.3 wt % Au/Al—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 30. Support size was 3 mm extrudates (cylinders).

Example #42 1.4 wt % Au/Ga—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 31. Support size was 3 mm extrudates (cylinders).

Example #43 1.4 wt % Au/In—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 32. Support size was 3 mm extrudates (cylinders).

Example #44 1.5 wt % Au/Ce—SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 33. Support size was 3 mm extrudates (cylinders).

Example #45 1.5 wt % Au/pre-calcined SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 10. Support size was 3 mm extrudates (cylinders).

Example #46 1.2 wt % Au/SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 37. Support size was 3 mm extrudates (cylinders).

Example #47 1.2 wt % Au/SiC

Catalyst was prepared by incipient wetness impregnation followed by drying and calcination in air using a box oven equipped with air purge.

Sodium aurothiomalate(I) was used as source of Au. The same catalyst composition and preparation were used as in Example 9. Support size was 1 mm extrudates (cylinders).

Example #48 1.2 wt % Au/pre-calcined SiC

Catalyst was prepared by incipient wetness impregnation followed by drying and calcination in air using a box oven equipped with air purge.

Sodium aurothiomalate(I) was used as source of Au. The same preparation was used as in Example 9. SiC support was pre-calcined for 4 h at 600° C. (ramping rate of 5° C./min) on air prior to catalyst preparation. Support size was 1 mm extrudates (cylinders).

Pre-calcined support has BET surface area of 26 m²/g and avg. pore width of 12.7 nm.

Example #49 1.6 wt % Au/Zr—SiC a) Preparation of SiC Support Promoted with Zr "Zr—SiC"

SiC support was same as in Example 9, support size was 1 mm extrudates (cylinders). The same preparation method was used as in Example 18-a.

The as-promoted SiC support contains ~6.8 wt % of Zr (in the form of oxide). Zr—SiC support has BET surface area of 30 m²/g and avg. pore width of 10.7 nm.

b) Preparation of 1.6 wt % Au/Zr—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Zr—SiC.

Example #50 1.4 wt % Au/Ti—SiC a) Preparation of SiC Support Promoted with Ti "Ti—SiC"

SiC support was same as in Example 9, but support size was 1 mm extrudates (cylinders). The same preparation method was used as in Example 19-a.

The as-promoted SiC support contains ~4.5 wt % of Ti (in the form of oxide). Ti—SiC support has BET surface area of 32 m²/g and avg. pore width of 10 nm.

b) Preparation of 1.4 wt % Au/Ti—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Ti—SiC.

Example #51 1.6 wt % Au/Zr—SiC a) Preparation of SiC Support Promoted with Zr "Zr—SiC"

The support was the same used in Example 49.

b) Preparation of 1.6 wt % Au/Zr—SiC

The catalyst was prepared by incipient wetness impregnation followed by drying and calcination in air using a box oven with static air.

Sodium aurothiomalate(I) was used as source of Au. The same preparation was used as in Example 49-b.

Example #52 1.4 wt % Au/Ti—SiC a) Preparation of SiC Support Promoted with Ti "Ti—SiC"

The support was the same used in Example 50.

b) Preparation of 1.4 wt % Au/Ti—SiC

The catalyst was prepared by incipient wetness impregnation followed by drying and calcination in air using a box oven with static air.

Sodium aurothiomalate(I) was used as source of Au. The same preparation was used as in Example 50-b.

Example #53 2.3 wt % Au/La—SiC a) Preparation of SiC Support Promoted with La "La—SiC"

SiC support was the same as in Example 9, but support size was 1 mm extrudates (cylinders). Preparation method was similar to that used as in Example 22-a.

The as-promoted SiC support contains ~26 wt % of La (in the form of oxide). La—SiC support has BET surface area of 10 m²/g and avg. pore width of 12.5 nm.

b) Preparation of 2.3 wt % Au/La—SiC The catalyst was prepared by incipient wetness impregnation followed by drying and calcination in air using a box oven with static air.

Sodium aurothiomalate(I) was used as source of Au. The same preparation was used as in Example 24-b.

Example #54 1.4 wt % Au/Cr—SiC a) Preparation of SiC Support Promoted with Cr "Cr—SiC"

SiC support was same as in Example 9, but support size was 1 mm extrudates (cylinders). Preparation method was similar to that used as in Example 25-a.

The as-promoted SiC support contains ~4.6 wt % of Cr (in the form of oxide). Cr—SiC support has BET surface area of 22 m²/g and avg. pore width of 14.5 nm.

b) Preparation of 1.4 wt % Au/Cr—SiC

The catalyst was prepared by incipient wetness impregnation followed by drying and calcination in air using a box oven with static air.

Sodium aurothiomalate(I) was used as source of Au. The same preparation was used as in Example 25-b.

Example #55 1.4 wt % Au/Mn—SiC a) Preparation of SiC Support Promoted with Mn "Mn—SiC"

SiC support was same as in Example 9, but support size was 1 mm extrudates (cylinders). Preparation method was similar to that used as in Example 26-a.

The as-promoted SiC support contains ~5.1 wt % of Mn (in the form of oxide). Mn—SiC support has BET surface area of 22 m²/g and avg. pore width of 12.5 nm.

b) Preparation of 1.4 wt % Au/Mn—SiC

The catalyst was prepared by incipient wetness impregnation followed by drying and calcination in air using a box oven with static air.

Sodium aurothiomalate(I) was used as source of Au. The same preparation was used as in Example 26-b.

Example #56 Non-Promoted 1.2 wt % Au/SiC

Catalyst was prepared by incipient wetness impregnation followed by drying and calcination in air using a box oven with static air.

Sodium aurothiomalate(I) was used as source of Au. The same catalyst composition and preparation was used as in Example 9. Support size was 1 mm extrudates (cylinders).

Example #57 1.2 wt % Au/Pre-Calcined SiC

Catalyst was prepared by incipient wetness impregnation followed by drying and calcination in air using a box oven with static air.

Sodium aurothiomalate(I) was used as source of Au. The same preparation was used as in Example 9. SiC support was pre-calcined for 4 h at 600° C. on air prior to catalyst preparation. Support size was 1 mm extrudates (cylinders).

Pre-calcined support has BET surface area of 26 m²/g and avg. pore width of 12.7 nm.

TABLE 3

| | | | | | | | | |
|---|---|---|---|---|---|---|---|---|
| Catalytic data for Examples tested in fixed bed reactor. | | | | | | | | |
| Example | Pellet size [mm] | Reactor type | Au loading [wt %] | Promoter | Promoter loading [wt %] | Support | MMA Space time yield, mol/kg_cat/h | MMA sel. (%) |
| 38 | 3 | Fixed bed | 1.5 | — | — | SiC | 1.6 | >99 |
| 39 | 3 | Fixed bed | 1.5 | Zr | 6.9 | Zr—SiC | 2.1 | >99 |
| 40 | 3 | Fixed bed | 1.5 | Ti | 4.0 | Ti—SiC | 2.3 | >99 |
| 41 | 3 | Fixed bed | 1.5 | Al | 3.2 | Al—SiC | 1.0 | >99 |
| 42 | 3 | Fixed bed | 1.4 | Ga | 4.4 | Ga—SiC | 2.3 | >99 |
| 43 | 3 | Fixed bed | 1.4 | In | 12.9 | In—SiC | 2.2 | >99 |
| 44 | 3 | Fixed bed | 1.5 | Ce | 12.7 | Ce—SiC | 2.4 | >99 |
| 45 | 3 | Fixed bed | 1.5 | — | — | SiC calcined at 600° C./4 h | 2.1 | >99 |
| 46 | 3 | Fixed bed | 1.2 | — | — | SiC | 1.4 | >99 |
| 47 | 1 | Fixed bed | 1.2 | — | — | SiC | 4.3 | >99 |
| 48 | 1 | Fixed bed | 1.2 | — | — | SiC calcined at 600° C./4 h | 3.2 | >99 |
| 49 | 1 | Fixed bed | 1.6 | Zi | 6.8 | Zr—SiC | 4.5 | >99 |
| 50 | 1 | Fixed bed | 1.4 | Ti | 4.5 | Ti—SiC | 5.5 | >99 |
| 51 | 1 | Fixed bed | 1.6 | Zr | 6.8 | Zr—SiC | 3.4 | >99 |
| 52 | 1 | Fixed bed | 1.4 | T | 4.5 | Ti—SiC | 3.2 | >99 |
| 53 | 1 | Fixed bed | 2.3 | La | 26 | La—SiC | 1.4 | >99 |
| 54 | 1 | Fixed bed | 1.4 | Cr | 4.6 | Cr—SiC | 2.1 | >99 |
| 55 | 1 | Fixed bed | 1.4 | Mn | 5.1 | Mn—SiC | 2.5 | >99 |
| 56 | 1 | Fixed bed | 1.2 | — | — | SiC | 1.6 | >99 |
| 57 | 1 | Fixed bed | 1.2 | — | — | SiC calcined at 600° C./4 h | 2.7 | 98 |

Comparative Examples

Comparative Example #1 Blank Pre-Calcined SiC

Pre-calcined SiC support was used as catalyst.

SiC material the same as in Example 9 was used. Prior to use the support was pre-calcined on air for 4 h at 600° C. (ramping rate 5° C./min).

Comparative Example #2 1.5 wt % Au/SiC Low Surface Area

The catalyst was prepared by incipient wetness impregnation followed by drying and calcination in air using a box oven equipped with air purge.

Sodium aurothiomalate(I) was used as source of Au. The same preparation was used as in Example 3, but the support was SIC XC69374 from NORPRO (5 mm spheres, BET surface area <0.5 m²/g).

Comparative Example #3 1.5 wt % Au/SiC Low Surface Area

The catalyst was prepared by incipient wetness impregnation followed by drying and calcination in air using a box oven equipped with air purge.

Sodium aurothiomalate(I) was used as source of Au. SiC support was SiC 70 grit with low surface area <0.1 m²/g. Prior to use the support was pre-calcined on air for 4 h at 500° C. (ramping rate 5° C./min). The same preparation was used as in Example 3.

Comparative Example #4 1 wt % Au/SiC Prepared by DP

Catalyst was prepared by deposition-precipitation method. SiC support was same as in Example 1, 3 mm extrudates.

1) 76 ml of DI water was added to 120 ml beaker. 2) Appropriate amount of 0.2 M gold (III) tetrachloric acid solution in DI water (to achieve 1 wt % Au loading for 5 g support) was added and pH of the resulting solution is ~2.3) 5 g SiC support was added to the solution. 4) pH was adjusted to 7 by 0.3 M NaOH solution. 5) T was raised to 70° C. 6) the slurry was aged for 45 min at 500 rpm at 70° C. Then decanted and washed with DI water (1.5 L). The as prepared sample was dried and calcined using the following program: RT→120° C. at 5° C./min, dwell 1 h, 120→300° C. at 5° C./min, dwell for 4 h, cool down to room temperature in 2 h.

Comparative Example #5 1 wt % Au/SiC Prepared by DP

Catalyst was prepared by deposition-precipitation method. SiC support was same as in Example 1, 3 mm extrudates.

1) 76 ml of DI water was added to 120 ml beaker. 2) T was raised to 70° C. 3) Appropriate amount of 0.2 M gold (III) tetrachloric acid solution in DI water (to achieve 1 wt % Au loading for 5 g support) was added. 4) pH was adjusted to ~7 by addition of 0.3 M NaOH solution (color changed from yellow to brown). 5) 5 g of SiC extrudates were added and the slurry was aged for 40 min at 500 rpm at 70° C. Then decanted and washed with DI water (1.5 L). The as prepared sample was dried and calcined using the following program:

RT→120° C. at 5° C./min, dwell 1 h, 120→300° C. at 5° C./min, dwell for 4 h, cool down to room temperature in 2 h.

Comparative Example #6 1.3 wt % Au/Mo—SiC a) Preparation of SiC Support Promoted with Mo "Mo—SiC"

The same SiC support and preparation method were used as Example 18-a, but instead of 22 ml zirconium(IV) oxynitrate hydrate solution, 22 ml of 0.0714 M Ammonium molybdate (VI) tetrahydrate (MW=1235.86 g/mol, $(NH_4)_6Mo_7O_{24}*4H_2O$) solution in DI water were used.

The as-promoted SiC support contains ~2.5 wt % of Mo (in the form of oxide). Mo—SiC support has BET surface area of 17 m²/g and avg. pore width of 11.7 nm.

b) Preparation of 1.3 wt % Au/Mo—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Mo—SiC.

Comparative Example #7 1.3 wt % Au/W—SiC a) Preparation of SiC Support Promoted with W "W—SiC"

The same SiC support and preparation method were used as Example 18-a, but instead of 22 ml zirconium(IV) oxynitrate hydrate solution, 22 ml of 0.0417 M Ammonium tungsten oxide hydrate (MW=1235.86 g/mol, $(NH_4)_6W_{12}O_{39}*xH_2O$) solution in DI water were used.

The as-promoted SiC support contains ~2.5 wt % of W (in the form of oxide). W—SiC support has BET surface area of 23 m²/g and avg. pore width of 12.6 nm.

b) Preparation of 1.3 wt % Au/W—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was W—SiC.

Comparative Example #8 1.3 wt % Au/Cu—SiC a) Preparation of SiC Support Promoted with Cu "Cu—SiC"

The same SiC support and preparation method were used as Example 18-a, but instead of 22 ml zirconium(IV) oxynitrate hydrate solution, 11 ml of 1M Copper(II) nitrate hemi(pentahydrate), 98% (MW=223.52 g/mol, $Cu(NO_3)_2*2.5H_2O$) solution in DI water were used.

The as-promoted SiC support contains ~5.5 wt % of Cu (in the form of oxide). Cu—SiC support has BET surface area of 21 m²/g and avg. pore width of 13.9 nm.

b) Preparation of 1.3 wt % Au/Cu—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Cu—SiC.

Comparative Example #9 1.5 wt % Au/Zn—SiC a) Preparation of SiC Support Promoted with Zn "Zn—SiC"

The same SiC support and preparation method were used as Example 18-a, but instead of 22 ml zirconium(IV) oxynitrate hydrate solution, 5.5 ml of 2M Zinc (II) nitrate hexahydrate (MW=297.47 g/mol, $Zn(NO_3)_2*6H_2O$) solution in DI water were used. The as-promoted SiC support contains ~6.6 wt % of Zn (in the form of oxide). Zn—SiC support has BET surface area of 22 $m^2$/g and avg. pore width of 13.4 nm.

b) Preparation of 1.5 wt % Au/Zn—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Zn—SiC.

Comparative Example #10 1.3 wt % Au/Sb—SiC a) Preparation of SiC Support Promoted with Sb "Sb—SiC"

The same SiC support and preparation method were used as Example 24-a, but instead 10 ml Ammonium niobate(V) oxalate hydrate solution, 5 ml of 0.5M Antimony(III) acetate solution in 3M citric acid was used for impregnation of 10 g of SiC support.

For preparation of Antimony(III) acetate solution 3.73 g of Antimony(III) acetate (MW=298.88 g/mol, $(CH_3CO_2)_3Sb$) were placed in a beaker followed by 25 ml of 3M citric acid in DI water. The slurry was vigorously stirred at room temperature and 25 wt % ammonium hydroxide solution was added dropwise to it until the transparent solution was formed.

The as-promoted SiC support contains ~3.4 wt % of Sb (in the form of oxide). Sb—SiC support has BET surface area of 20 $m^2$/g and avg. pore width of 17.4 nm.

b) Preparation of 1.3 wt % Au/Sb—SiC

The catalyst was prepared by incipient wetness impregnation followed by drying and calcination in air using a box oven equipped with air purge.

Sodium aurothiomalate(I) was used as source of Au. The same preparation was used as in Example 3, but the support was Sb—SiC.

Comparative Example #11 1.5 wt % Au/Zn—SiC a) Preparation of SiC Support Promoted with Zn "Zn—SiC"

SiC support was the same as in Comparative Example 9, support size was 1 mm extrudates (cylinders).

The as-promoted SiC support contains ~6.4 wt % of Zn (in the form of oxide). Zn—SiC support has BET surface area of 21 $m^2$/g and avg. pore width of 12.0 nm.

b) Preparation of 1.5 wt % Au/Zn—SiC

The catalyst was prepared by incipient wetness impregnation followed by drying and calcination in air using a box oven with static air.

Sodium aurothiomalate(I) was used as source of Au. The same preparation was used as in Comparative Example 9-b.

Comparative Example #12 1.5 wt % Au/Carbon 1.5 wt % Au/Carbon was prepared by incipient wetness impregnation followed by drying and calcination in air using a box oven equipped with air purge.

Gold (III) acetate was used as source of Au. The same preparation was used as in Example 1 but the support was mesoporous carbon meso-C+™ from SiCat Catalyst (3 mm extrudates (cylinders), BET surface area 286 $m^2$/g, pore volume 0.52 $cm^3$/g (by Hg intrusion), avg. pore width 2.7 nm, pore volume for incipient wetness impregnation determined by DI water 0.5 $cm^3$/g).

Comparative Example #13 1.5 wt % Au/Carbon 1.5 wt % Au/Carbon was prepared by incipient wetness impregnation followed by drying and calcination in air using a box oven equipped with air purge.

Sodium aurothiomalate(I) was used as source of Au. The same preparation was used as in Example 3, but the support was mesoporous carbon meso-C+™ from SiCat Catalyst same as in Comparative Example 12.

Comparative Example #14 1.5 wt % Au/TiO₂

1.5 wt % $Au/TiO_2$ was prepared by incipient wetness impregnation followed by drying and calcination in air using a box oven equipped with air purge.

Sodium aurothiomalate(I) was used as source of Au. The same preparation was used as in Example 3, but the support was high surface area $TiO_2$ (NORPRO ST61120, 3 mm cylinders, 100% anatase (XRD), BET surface area 148 $m^2$/g, avg. pore width 9.3 nm, pore volume determined by DI water for incipient wetness 0.57 $cm^3$/g).

Comparative Example #15 1.5 wt % Au/TiO₂

1.5 wt % $Au/TiO_2$ was prepared by incipient wetness impregnation followed by drying and calcination in air using a box oven equipped with air purge.

Sodium aurothiomalate(I) was used as source of Au. The same preparation was used as in Example 3, but the support was high surface area $TiO_2$ (NORPRO ST31119, 3 mm cylinders, 100% anatase (XRD), BET surface area 37 $m^2$/g, avg. pore width 15.5 nm, pore volume determined by DI water for incipient wetness 0.43 $cm^3$/g).

Comparative Example #16 1.5 wt % Au/ZrO₂ by DP 1.5 wt % $Au/ZrO_2$ was prepared by deposition-precipitation method. $ZrO_2$ support was NOPRRO SZ31164, 3 mm extrudates, monoclinic phase (XRD), BET surface area 98 $m^2$/g, avg. pore width 11 nm. The support was crushed and sieved to smaller than 100 mesh size prior to catalyst preparation.

2.85 ml of 0.2 M $HAuCl_4$ in DI Water and 150 ml DI water were added into a beaker equipped with a stir bar and placed on a heating plate, then added dropwise 1M NaOH to pH=8±0.2, followed by 7.5 g of $ZrO_2$ support, while stirring at 300 rpm. The slurry was stirred for 2 h at 70° C.

The catalyst was filtered through a paper filter and washed with DI water (1 L). The catalyst was dried overnight in the fume hood and then calcined in the box oven on air (static air) at 300° C. for 4 h (heating rate 2° C./min). Catalyst was sieved to 120-400 mesh prior testing in the slurry reactor.

Comparative Example #17 1.5 wt % Au/Al₂O₃

1.5 wt % $Au/Al_2O_3$ was prepared by incipient wetness impregnation followed by drying and calcination in air using a box oven equipped with air purge.

Sodium aurothiomalate(I) was used as source of Au. The same preparation was used as in Example 3, but the support was high surface area $Al_2O_3$(NORPRO gamma $Al_2O_3$, 1/16" pellets, BET surface area 245 $m^2$/g, avg. pore width 9.4 nm, pore volume determined by DI water for incipient wetness 0.8 $cm^3$/g).

TABLE 4

| Comparative example | Reactor type | Pellet size [mm] | Au loading [wt %] | Promoter | Promoter loading [wt %] | Support | MMA Space time yield, mol/kg_cat/h | MMA sel. (%) |
|---|---|---|---|---|---|---|---|---|
| | | | | Catalytic data for Comparative examples in slurry and fixed bed tests. | | | | |
| 1 | Slurry | | — | — | — | SiC calcined at 600° C./4 h | 0.2 | >99 |
| 2 | Slurry | | 1.5 | — | — | SiC | 2.1 | >99 |
| 3 | Slurry | | 1.5 | — | — | SiC calcined at 500° C./4 hr | 0 | 0 |
| 4 | Slurry | | 1 | — | — | SiC | 1.2 | >99 |
| 5 | Slurry | | 1 | — | — | SiC | 1.3 | >99 |
| 6 | Slurry | | 1.3 | Mo | 2.5 | Mo—SiC | 1.2 | >99 |
| 7 | Slurry | | 1.3 | W | 2.5 | W—SiC | 4.9 | >99 |
| 8 | Slurry | | 1.3 | Cu | 5.5 | Cu—SiC | 2.2 | >99 |
| 9 | Slurry | | 1.5 | Zn | 6.6 | Zn—SiC | 5.5 | >99 |
| 10 | Slurry | | 1.3 | Sb | 3.4 | Sb—SiC | 1.1 | >99 |
| 11 | Fixed bed | 1 | 1.5 | Zn | 6.4 | Zn—SiC | 0.1 | >99 |
| 12 | Slurry | | 1.5 | — | — | Carbon | 7.6 | >99 |
| 13 | Slurry | | 1.5 | — | — | Carbon | 18.6 | >99 |
| 14 | Slurry | | 1.5 | — | — | TiO$_2$ | 28.5 | 99 |
| 15 | Slurry | | 1.5 | — | — | TiO$_2$ | 25.0 | >99 |
| 16 | Slurry | | 1.5 | — | — | ZrO$_2$ | 7.5 | 99 |
| 17 | Slurry | | 1.5 | — | — | Al$_2$O$_3$ | 18.9 | 98 |

Slurry Reactor Test Conclusions

Examples 1-14 and Example 37 demonstrate that Au catalysts supported on SiC support with surface area greater than 10 m$^2$/g are active in oxidative esterification reaction of methacrolein to methyl methacrylate with MMA STY in the range of 5-25 mol/kg_cat/h.

Examples 18-36 demonstrate that SiC support can be promoted prior to depositing gold in order to enhance catalyst activity: promoters Zr, Ti, Sc, Y, La, Mn, Ni, Al, Ga, In, Ce, Sn show activity outperforming reference unpromoted Au/SiC catalyst (Example 39, MMA STY 19.7)

Other Au/X—SiC catalysts doped with elements such as V, Nb, Cr, Fe, Co, Pb, and Bi showed good activity with MMA STY >10.

Promoted SiC supports were calcined at 600° C. prior to depositing gold. Thus, a sample was prepared on the pre-calcined SiC to confirm the promotional effect of elements. Example 10 shows that the use of pre-calcined SiC as support does not enhance catalyst activity compared to non-calcined support material used in Example 3, thus, the promotional effect in Examples 18-36 come from the use of promoters and not from the calcination treatment of SiC support.

Comparative Examples 6-11 demonstrate that not all elements can be used as promoters: addition of Mo, W, Cu, Zn, or Sb to the SiC support decreased catalyst activity dramatically in both slurry and fixed bed reactor tests.

Comparative Examples 12-13 describe Au/carbon catalysts; carbon support is less mechanically strong and more prone to attrition than SiC, and these catalysts in general had lower activity than Au/SiC.

Examples 15-17 demonstrate that active OER catalysts can be prepared by using other carbon-containing supports as mesoporous carbon or mixed carbide TiC—SiC. The use of pre-calcined TiC—SiC in Example 17 enhances activity compared to non-calcined TiC—SiC used in Example 15 presumably due to promotional effect of TiO$_2$ particles formed as result of TiC calcination (compare with promotional effect of Ti addition to SiC in Example 19 vs unpromoted Au/SiC catalyst performance in Example 37).

Fixed-Bed Reactor Test Conclusions

Examples 38-46 are 3 mm extrudates, while Examples 47-57-1 mm extrudates.

Examples 38, 45, 46, 47, 48, 56 and 57 show that unpromoted Au/SiC catalysts can be used in the fixed bed application demonstrating high activity (MMA STY) and selectivity to MMA.

Examples 39-44 show the promotional effect of dopants such as Zr, Ti, Al, Ga, In, and Ce in comparison with unpromoted Example 38, 46, and Example 47 prepared using pre-calcined SiC.

Examples 49, 50 show promotional effect of Zr and Ti, respectively, compared to unpromoted Au/SiC Examples 47 and 48.

Examples 51-57 show that catalysts prepared using a calcination oven with static air have slightly lower activity than the ones prepared using calcination oven with air purge (Examples 47-50).

Comparative Example 11 shows that addition of Zn to SiC prior to depositing Au results in a drop of catalyst activity consistent to that observed in the slurry tests (Examples 3, 37 and Comparative Example 9).

Comparative Example 14-16 demonstrate that while Au supported on high surface area TiO$_2$ or ZrO$_2$ are active in OER, these supports are significantly weaker than SiC and more prone to attrition (Table 1).

Comparative Example 17 demonstrate that while Au/Al$_2$O$_3$ catalyst is quite active in OER, the Al$_2$O$_3$ support is not stable under acidic conditions and can leach Al to the solution (Table 1).

The invention claimed is:

1. A catalyst comprising a noble metal disposed on a support, wherein the noble metal is present in an amount ranging from 0.1 wt % to 10 wt % relative to the total weight of the catalyst, wherein the support comprises at least 50 wt % silicon carbide relative to the total weight of the support, and wherein the silicon carbide has a surface area of at least 5 m$^2$/g, wherein the noble metal comprises gold and the support further comprises at least one promoter in an amount greater than 0 weight percent and up to 50 weight percent.

2. The catalyst of claim 1, wherein the noble metal further comprises palladium.

3. The catalyst of claim 1, wherein the promoter comprises titanium, zirconium, scandium, yttrium, lanthanum, vanadium, niobium, chromium, manganese, iron, cobalt, nickel, aluminum, gallium, indium, cerium, tin, lead, bismuth, sulfur, alkali metals, or alkaline earth metals.

4. The catalyst of claim 3, wherein the promoter comprises titanium, zirconium, sulfur, alkali metals, and alkaline earth metals.

5. The catalyst of claim 3, wherein the promoter comprises titanium or zirconium.

6. The catalyst of claim 1, wherein the support comprises at least 75 wt % silicon carbide relative to the total weight of the support.

7. The catalyst of claim 1, wherein the catalyst has a mean particle diameter ranging from 1 to 200 microns.

8. The catalyst of claim 1, wherein the catalyst has a mean particle diameter ranging from greater than 200 microns to 30 mm.

9. The catalyst of claim 1, wherein the support comprises a core and a shell surrounding the core, wherein either the core comprises SiC and the shell comprises alumina, silica, magnesia, zirconia, hafnia, vanadia, niobium oxide, tantalum oxide, ceria, yttria, lanthanum oxide, or a combination thereof, or a material which is a promoter selected from titanium, zirconium, scandium, yttrium, lanthanum, vanadium, niobium, chromium, manganese, iron, cobalt, nickel, aluminum, gallium, indium, cerium, tin, lead, bismuth, sulfur, alkali metals, or alkaline earth metals; or the shell comprises SiC and the core comprises $\gamma$, $\delta$ or $\theta$ alumina, silica, and magnesia.

10. The catalyst of claim 1, wherein at least 80 wt % of the noble metal is disposed on an outer surface of the support forming an eggshell layer wherein the eggshell layer is defined by an inner surface in contact with the outer surface of the support and an outer surface as the surface of the catalyst particle the eggshell layer being an outer percent of the catalyst volume.

11. The catalyst of claim 10, wherein at least 80 wt % of the noble metal is present in the eggshell layer which comprises an outer 60% of catalyst volume.

12. A method for preparing methyl methacrylate from methacrolein and methanol; said method comprising contacting in a reactor a liquid phase at temperature of 40 to 120° C. mixture comprising methacrolein and methanol and a gas phase oxygen in the presence of the catalyst at a pressure of 101 kPa to 14 MPa according to claim 1.

* * * * *